F. G. FORD.
FLOUR AND MEAL SIFTER.
No. 178,131. Patented May 30, 1876.
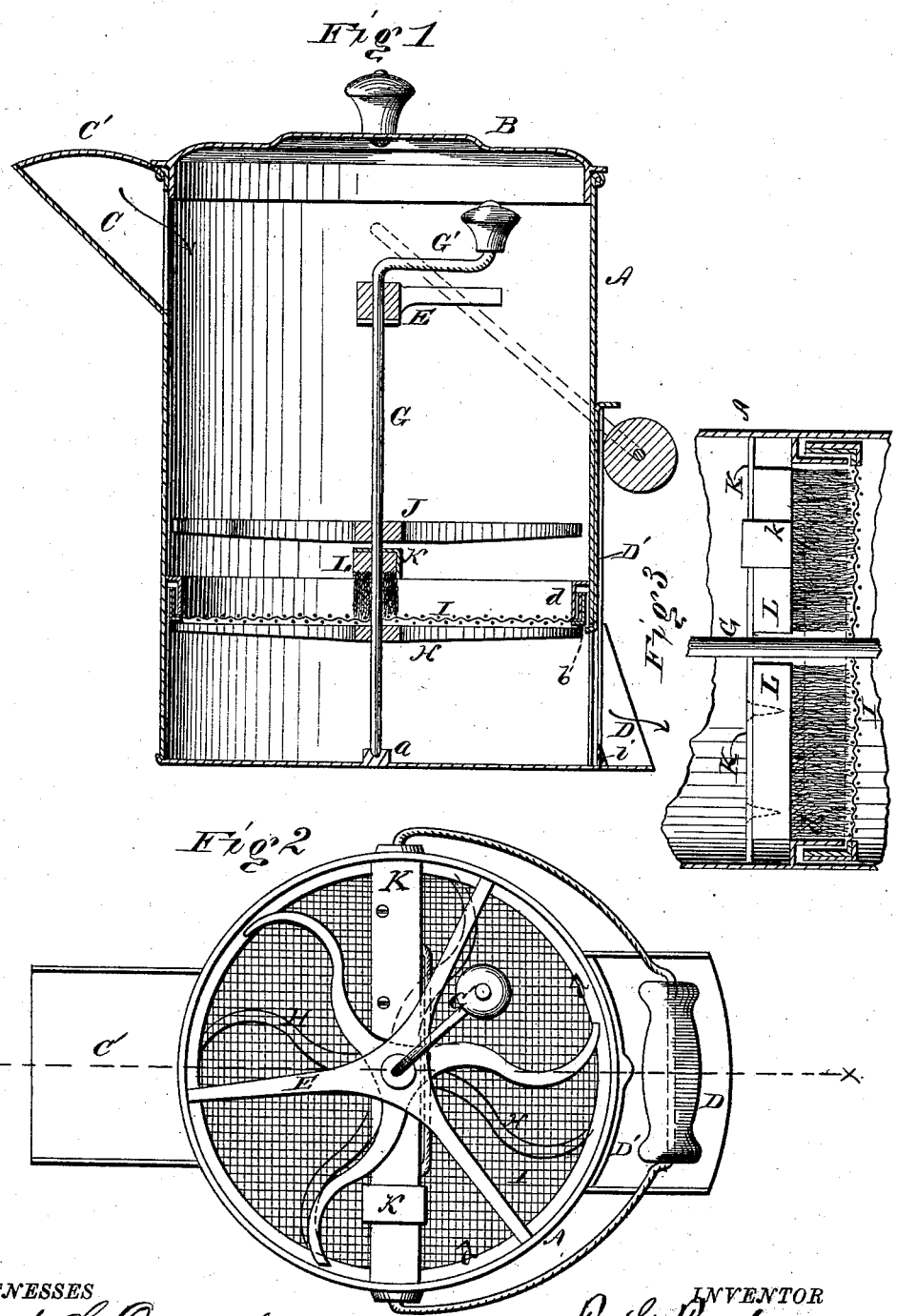

UNITED STATES PATENT OFFICE.

FREDERIC G. FORD, OF PHILADELPHIA, PENNSYLVANIA.

IMPROVEMENT IN FLOUR AND MEAL SIFTERS.

Specification forming part of Letters Patent No. 178,131, dated May 30, 1876; application filed March 30, 1876.

*To all whom it may concern:*

Be it known that I, F. G. FORD, of Philadelphia, in the county of Philadelphia and in the State of Pennsylvania, have invented certain new and useful Improvements in Flour and Meal Sifter; and do hereby declare that the following is a full, clear, and exact description thereof, reference being had to the accompanying drawing, and to the letters of reference marked thereon, making a part of this specification:

The nature of my invention consists in the construction and arrangement of a flour and meal sifter, as will be hereinafter more fully set forth.

In order to enable others skilled in the art to which my invention appertains to make and use the same, I will now proceed to describe its construction and operation, referring to the annexed drawing, in which—

Figure 1 is a vertical section of my invention. Fig. 2 is a plan view of the same, with the top removed. Fig. 3 is an enlarged section of the sifter, showing a side view of the brush.

A represents a cylindrical pail or vessel, of any suitable dimensions, provided with a lid, B. At the top of the vessel A, on one side, is an inlet-spout, C, provided with a hinged lid, C', for the admission of the flour into the vessel. On the opposite side, at the bottom, is an outlet-spout, D, provided with a sliding door, D', through which the flour passes out from the vessel after being sifted. Near the upper end of the vessel A is a spider, E, through which passes a vertical shaft, G, having its bearing in a step, *a*, on the bottom of the vessel, and is provided with a crank, G', on its upper end. On the shaft G, a suitable distance above the lower end, is secured a spider, H, which supports a wire sieve, I. The rim *b* of this sieve is secured to the ends of the arms of the spider, so that the sieve will revolve with the same. The sieve-rim *b* extends up under a flange, *d*, secured to and around the inside of the vessel A, so as to prevent any unsifted flour from falling down between the sieve and the vessel. A suitable distance above the sieve I, on the shaft G, are secured arms J J, which revolve with the shaft. These arms may be curved in any desired manner, and agitate the flour before it reaches the sieve. Below these agitator-arms is a cross-bar, K, fastened to the sides of the vessel, and through which the shaft G passes. To the under side of this cross-bar are fastened brushes L, by means of screws, clamps *k*, or other fastenings, arranged in such a manner that the brushes can be adjusted to the sieve, and also be easily removed and others substituted when required.

The operation of my invention is easily seen. The flour is put in either through the spout C or by taking off the lid. Then, by revolving the crank G', the arms J agitate the flour, and the sieve I sifts it while it carries the flour under the brush L, and the sifted flour passes out through the spout D.

For family use, where ordinarily only a small quantity of flour is sifted at a time, the upper spout C may be dispensed with; while for baker's use this spout should be employed, so that one man can pour in the flour while another is operating the sifter. The shaft G may be operated by cog-gearing suitably arranged for that purpose. P is an ordinary bail or handle for the vessel A. In the bottom of the lower spout D is a lip, *i*, which, when the door D' is closed, renders the same air-tight and prevents the ingress of insects.

This sifter may be used for flour, meal, buckwheat, cracker-dust, or any other article that can be sifted by it.

Having thus fully described my invention, what I claim as new, and desire to secure by Letters Patent, is—

1. In a flour and meal sifter, the combination of a revolving sieve, a stationary brush, and revolving agitators, substantially as and for the purposes herein set forth.

2. The combination of the vertical rotating shaft G, stationary spider E, rotating agitators J, stationary cross-bar K, with adjustable brushes L, rotating sieve I, supported on the spider H, and the flange *d*, all constructed substantially as and for the purposes herein set forth.

3. The combination of the vessel A, provided with spout C at the top, spout D at the bottom, and sliding door D', the shaft G, rotating sieve I, stationary brush L, and rotating agitators J, all constructed substantially as described, whereby, as the flour is fed in through the spout at the top, it is sifted and passed out through the bottom spout, as set forth.

In testimony that I claim the foregoing I have hereunto set my hand this 23d day of March, 1876.

F. G. FORD.

Witnesses:
   M. L. STOWELL,
   H. A. HALL.